United States Patent Office 3,290,292
Patented Dec. 6, 1966

3,290,292
1,1′-LOWER ALKYLENE-BIS-(5-AROMATIC-1,4-BENZODIAZEPIN-2-ONES)
James Valentine Earley, Cedar Grove, Rodney Ian Fryer, West Orange, and Leo Henryk Sternbach, Upper Montclair, N.J., assignors to Hoffmann-La Roche Inc., Nutley, N.J., a corporation of New Jersey
No Drawing. Filed Mar. 17, 1964, Ser. No. 352,640
7 Claims. (Cl. 260—239.3)

The invention relates to novel 1,1′-lower alkylene-bis-(5-aromatic-1,4-benzodiazepines) and to novel processes useful in preparing same.

The novel 1,1′-lower alkylene-bis-(5-aromatic-1,4-benzodiazepines) and derivatives thereof to which the invention relates are selected from the group consisting of compounds of the formula

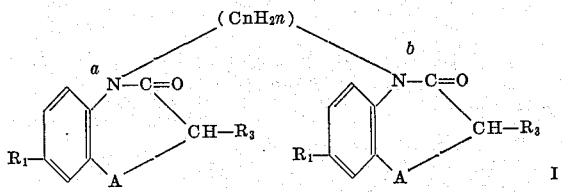

and pharmaceutically acceptable acid addition salts thereof wherein A is selected from the group consisting of

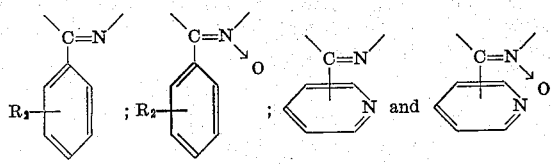

$n$ is a whole integer from 3 to 7; $R_1$ is selected from the group consisting of hydrogen, halogen, trifluoromethyl, lower alkylthio, nitro, cyano and lower alkyl; $R_2$ is selected from the group consisting of hydrogen, halogen, trifluoromethyl, lower alkyl and nitro; and $R_3$ is selected from the group consisting of hydrogen and lower alkyl.

Compounds of Formula I above wherein moieties $a$ and $b$ are the same and which contain a

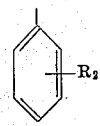

group are 1,1-lower alkylene-bis-[5-($R_2$-phenyl)-1,4-benzodiazepin-2-ones]. Compounds of Formula I above wherein moieties $a$ and $b$ are the same and which contain a

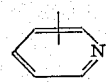

group are 1,1′-lower alkylene-bis-[5-pyridyl-1,4-benzodiazepin-2-ones].

The expression "lower alkyl," as utilized throughout the instant specification and claims, is intended to connote straight and branched chains lower alkyl groups such as methyl, ethyl, propyl, isopropyl, butyl and the like. The term "lower alkylthio" includes a group such as methylthio and the like. The term "halogen," as used herein in connection with Formula I, is intended to connote all four halides, i.e., chloride, fluorine, bromine and iodine. The expression "lower alkylene" represents a hydrocarbon group having from 3 to 7 carbon atoms (a $CnH_{2n}$ group), e.g., a straight chain polymethylene group such as propylene, butylene, pentylene and the like, or a branch chain group such as 2-methyl-propylene and the like. Insofar as the latter expression is concerned, polymethylene groups are preferred.

Compounds of Formula I above wherein A is

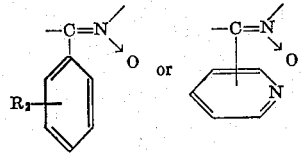

are especially of interest as intermediates for the preparation of compounds of Formula I above wherein A is

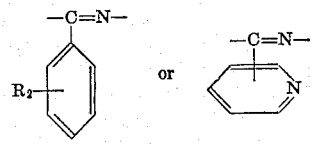

The last-mentioned compounds of Formula I above can be prepared from the corresponding first-mentioned compounds of Formula I above, i.e., those containing a 4-oxide group, by hydrogenation in the presence of a suitable hydrogenation catalyst such as Raney nickel or by treatment with a reducing agent, for example, a phosphorous trihalide such as phosphorous trichloride.

As is evident from the above, the benzodiazepine nucleus of moieties $a$ and $b$ can be substituted with the same or different groups. When a pyridyl group is present in moieties $a$ and/or $b$ of compounds of Formula I above, it is preferably an α-pyridyl group. $R_2$ in Formula I above is preferably joined to the phenyl ring in the 2′-position. Still more preferably, it is joined to the phenyl ring in the 2′-position and is halogen. $R_1$ in Formula I above, in a preferred aspect, is selected from the group consisting of halogen, trifluoromethyl, nitro and hydrogen.

In addition to compounds of Formula I above, there are also encompassed within the purview of the present invention the pharmaceutically acceptable acid addition salts of said compounds. The compounds of Formula I formed pharmaceutically acceptable acid addition salts with with one or more moles( depending on the number of basic nitrogen atoms present) of pharmaceutically acceptable acids, for example, with inorganic and organic acids such as hydrochloric acid, hydrobromic acid, sulfuric acid, phosphoric acid, nitric acid, citric acid, tartaric acid, salicylic acid, toluene-sulfonic acid, ascorbic acid, maleic acid, succinic acid, formic acid, acetic acid and the like.

Compounds of Formula I above wherein moieties $a$ and $b$ are the same are prepared, according to one aspect of the present invention, by a method which comprises the reaction of a 1-sodio derivative of a compound of the formula

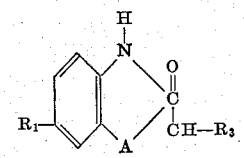

wherein A, $R_1$ and $R_3$ are as above
with a compound of the formula

$$X—CnH_{2n}—X' \quad \text{II}$$

wherein $n$ represents a whole integer from 3 to 7 and X and X′ are the same or different halogen atoms.

X and X′, advantageously, represent a member selected from the group consisting of bromine, chlorine and iodine.

In a preferred embodiment, X and X' are the same and are bromine, e.g., 1,4-dibromobutane.

Prior to the present invention, it has been found that the reaction of the sodio derivatives of compounds having the formula III above with compounds of the formula X—CnH$_2$n—X' wherein n, X and X' are as above, results in the preparation of compounds having the formula

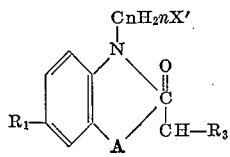

IV wherein A, X', n, R$_1$ and R$_3$ are as above.

It has now been surprisingly found, by the present applicants, that when reacting the sodio derivatives of compounds of the Formula III above with a compound having the formula X—CnH$_2$n—X', compounds Formula I above are prepared. Furthermore, it has been surprisingly found that when the molar amounts of the starting materials are varied, the procedure specified above can be adopted to favor either the preparation of compounds of Formula I above or the preparation of compounds of Formula IV above depending upon the compound desired. Thus, in the prepaartion of compounds corresponding to Formula I above wherein each of the benzodiazepine moieties a and b are the same, it is advantageous that the sodio derivative of a compound having the Formula III above be present in the reaction medium in excessive molar amounts when compared with the starting material having the formula X—CnH$_2$n—X'. In a preferred embodiment when it is desired to prepare the "bis" compounds, the sodio derivative of a compound corresponding to Formula III above is present in the reaction medium in the range of at least about 1.5 moles of the latter for every 1 mole of a compound having the formula X—CnH$_2$n—X' present the reaction medium, more preferably, about 2 moles of the former for every 1 mole of the latter. By providing the sodio derivative of a compound of Formula III above in such excesses in the reaction medium, it is assured that the formation of compounds having the Formula I above are favored. When a compound of Formula IV above is desired, the molar amount of the sodio derivative of the corresponding compound of the Formula III above present in the reaction medium is the same as or less than the molar amount of the compound having the formula X—CnH$_2$n—X' similarly present in the reaction. This technique assures that the formation of compounds of Formula IV above are favored.

Compounds of Formula I above can be isolated from a mixture containing compounds of Formula I above and compounds of Formula IV above by conventional techniques such as a distillation procedure, a recrystallization procedure or a chromatographic procedure.

The process for the preparation of compounds having the Formula I above wherein moieties a and b are the same, i.e., the reaction of sodio derivatives of compounds of Formula III above with compounds of the Formula X—CnH$_2$n—X' can be conducted in any convenient inert organic solvent utilizing one or more inert organic solvents such as methanol, ethanol, dimethylformamide, dimethylsulfoxide, benzene, toluene, N-methyl pyrrolidone or like. Temperature and pressure are not critical and the reaction can be carried out at room temperature and atmospheric pressure or at elevated temperatures and/or elevated pressures. Conventional reagents such as sodium methoxide, sodium hydride and the like can be employed to form the sodio derivative.

The reaction of the sodio derivatives of compounds of Formula III above wherein A is

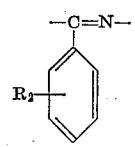

and R$_2$ is as above with a compound having the formula X—CnH$_2$n—X' wherein X, X' and n are as above yields the corresponding compounds having the formula

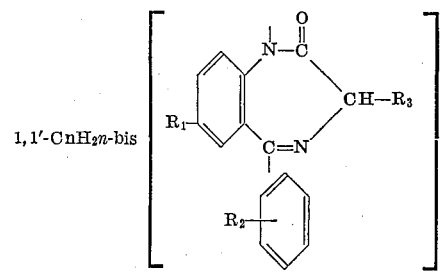

wherein R$_1$, R$_2$, R$_3$ and n have the same meaning as ascribed thereto hereinabove.

The reaction of the sodio derivatives of compounds of Formula III above wherein A is

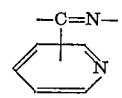

with a compound having the formula X—CnH$_2$n—X' wherein X, X' and n are as above yields the corresponding compounds having the formula

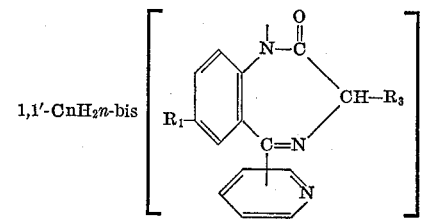

wherein R$_1$, R$_3$ and n have the same meaning as ascribed thereto hereinabove.

The reaction of the sodio derivatives of compounds of Formula III above wherein A is

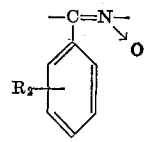

and R$_2$ is as above with a compound having the formula X—CnH$_2$n—X' wherein X, X' and n are as above yields the corresponding compounds having the formula

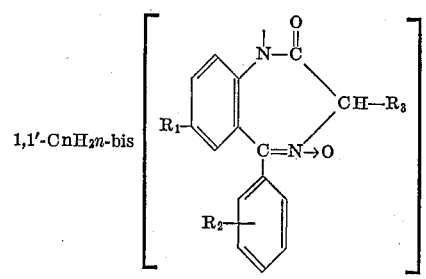

wherein R$_1$, R$_2$, R$_3$ and n have the same meaning as ascribed thereto hereinabove.

The reaction of the sodio derivatives of compounds of Formula III above wherein A is

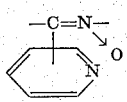

with a compound having the formula X—CnH$_{2n}$—X' wherein X, X' and n are as above, yields the corresponding compounds having the formula

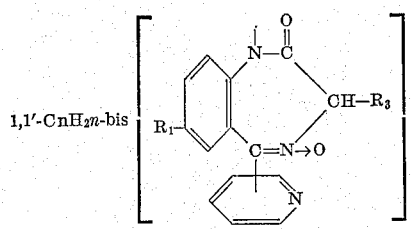

wherein R$_1$, R$_3$ and n have the same meaning as described thereto hereinabove.

In a novel process aspect of the invention, a compound corresponding to Formula I above wherein each of the benzodiazepine moieties a and b are different can be prepared by a method which comprises reacting a compound corresponding to Formula IV above with a sodio derivative of a compound corresponding to Formula III above, said compound of Formula IV being distinct from said last-mentioned compound of Formula III in that at least one of the members of the groups represented by A, R$_1$, R$_2$ and R$_3$ are different.

The sodio derivatives of the compounds of Formula III above are prepared, as is noted above, by reacting the compounds of Formula III above with a conventional sodio-forming reagent such as sodium methoxide, sodium hydride and the like in the presence of any convenient inert organic solvent such as methanol, ethanol, dimethylformamide, benzene, toluene, N-methylpyrrolidone or the like. As is similarly noted above, the temperature and pressure are not critical and the reaction can be carried out at room temperature and atmospheric pressure or at elevated temperatures and/or elevated pressures.

In effecting the reaction of compounds of Formula III above with compounds of Formula IV above, the sodio derivatives of compounds of Formula III can first be formed and the resultant compounds can then be combined with the compounds of Formula IV above. Alternatively, compounds of Formula III above and compounds of Formula IV can be added to the reaction medium and the sodio derivatives of compounds of Formula III can be formed therein by the appropriate sodio-forming reagents.

As is noted above, in the formation of a compound corresponding to Formula I above wherein the benzodiazepine moieties a and b are different, a reaction medium is employed which contains a mixture of the sodio derivative of a compound of the formula III above and a compound of the Formula IV above, such compounds differing in at least one of R$_1$, R$_2$, R$_3$ and A. In this manner, a myriad of different benzodiazepine moieties can be united by a lower alkylene bridge to form non-symmetrical bis-benzodiazepines.

Compounds of Formula I above wherein R$_1$ is nitro can be reduced by conventional techniques, i.e., hydrogenation in the presence of Raney nickel to form the corresponding compound wherein R$_1$ is amino. The resulting compound wherein R$_1$ is amino, if desired, can be converted to the corresponding compound wherein R$_1$ is halogen by treatment thereof with nitrous acid in the presence of mineral acid, e.g., hydrochloric acid, followed by treatment of the resulting substance with a strong hydrohalic acid, e.g., hydrochloric acid, in the presence of a copper catalyst, e.g., cuprous chloride.

Compounds of Formula I above and their pharmaceutically acceptable acid addition salts are useful as anticonvulsants, sedatives and muscle relaxants. They can be administered internally, for example, parenterally or enterally, in conventional pharmaceutical dosage forms. For example, they can be incorporated in conventional liquid or solid vehicles to provide elixirs, suspensions, tablets, capsules, powders and the like according to acceptable pharmaceutical practice.

The following examples are illustrative but not limitative of the invention. All temperatures are in degrees centigrade and all melting points are corrected.

Example 1

A solution of 75 g. (0.26 mole) of 7-chloro-1,3-dihydro-5-(2-fluorophenyl)-2H-1,4-benzodiazepin-2-one in 200 ml. of N,N-dimethylformamide was treated with 30 ml. of a methanolic solution of sodium methoxide (0.312 mole NaOCH$_3$). After stirring at room temperature for 20 minutes, 55 g. (0.32 mole) of 1-bromo-4-chlorobutane was added. The resultant mixture was stirred at 60° for six hours and then solvents were removed under reduced pressure. The residue was partitioned between 100 ml. of dichloromethane and 200 ml. of water and the layers separated. The aqueous layer was washed with 50 ml. of dichloromethane and the organic layers combined, washed with water (2 x 200 ml.) and dried. The solvent was removed, the residual oil dissolved in benzene and then filtered over 200 g. of Grade I activated neutral alumina. Removal of solvent gave an oil which, when dissolved in 300 ml. of ether, slowly deposited 1,1-tetramethylene-bis[7-chloro-5 - (2 - fluorophenyl) - 1,3 - dihydro - 2H - 1,4 - benzodiazepin-2-one]. Recrystallization from a mixture of dichloromethane and methanol gave the product as colorless prisms, M.P. 207–211°.

Example 2

A solution of 40 g. (0.148 mole) of 7-chloro-1,3-dihydro-5-phenyl-2H-1,4-benzodiazepin-2-one was dissolved in 125 ml. of N,N-dimethylformamide and treated at room temperature with 25 ml. of a solution of methanolic sodium methoxide (0.148 mole NaOCH$_3$). The mixture was stirred for 0.5 hr., 16.0 g. (0.074 mole) of 1,4-dibromobutane was added, and the solution stirred at 65° for 5 hr. Solvents were removed under reduced pressure leaving an oil as the residue. The oil was partitioned between dichloromethane (150 ml.) and water (150 ml.). A precipitate formed and was removed by filtration. Recrystallization from methanol gave 1,1'-tetramethylene - bis[7 - chloro - 1,3 - dihydro - 5 - phenyl-2H - 1,4 - benzodiazepin - 2 - one] as white prisms, M.P. 265–268°.

Example 3

A solution of 20 g. (0.0633 mole) of 5-(2-chlorophenyl) - 7 - nitro - 1,3 - dihydro - 2H - 1,4 - benzodiazepin-2-one in 75 ml. of N,N-dimethylformamide was treated with 10 ml. of methanolic sodium methoxide (0.069 mole) and then with 1,4-dibromobutane. The solution was stirred at 65° for 5 hr. Solvents were removed under reduced pressure leaving an oil as the residue. The oil was partitioned between dichloromethane (150 ml.) and water (150 ml.). A precipitate formed and was removed by filtration. Recrystallization from methanol gave 1,1'-tetramethylene-bis[5-(2-chlorophenyl) - 7 - nitro - 1,3 - dihydro - 2H - 1,4-benzodiazepin-2-one]. The dichloromethane layer was separated, washed, dried and evaporated. Crystallization of the oil from methanol gave more of the product. The combined product was recrystallized from a chloroform, ethanol mixture to give the product as yellow rods, M.P. 272–275°.

Example 4

A solution of 4.0 g. of 7-chloro-1,3-dihydro-5-phenyl-2H-1,4-benzodiazepin-2-one in 15 ml. of N,N-dimethylformamide was treated with 3.6 ml. of a methanolic solution of sodium methoxide (0.81 g. of sodium methoxide) and stirred at room temperature for 30 min. A solution of 5.6 g. of 7-chloro-1-(4-chlorobutyl)-1,2-dihydro-5-(2-fluorophenyl)-2H-1,4-benzodiazepin-2-one in 15 ml. of N,N-dimethylformamide was added. The mixture was stirred at 70° for 4 hr. and then concentrated to an oil under reduced pressure. Water (100 ml.) was added and the solution was extracted with dichloromethane (2 x 75 ml.). The organic layers were combined, washed with water, dried over anhydrous sodium sulfate, filtered and concentrated. The residue was recrystallized from a dichloromethane, methanol mixture to give 5-(2-fluorophenyl)-5'-phenyl-1,1'-tetramethylene bis[7-chloro-1,3-dihydro-2H-1,4-benzodiazepin-2-one] as pale yellow prisms, M.P. 237–240°.

Example 5

A solution containing 10 g. of 7-bromo-1,3-dihydro-5-(2-pyridyl)-2H-1,4-benzodiazepin-2-one and 8.3 ml. of a methanolic solution of sodium methoxide (2.04 g. sodium methoxide) in 25 ml. of N,N-dimethylformamide was stirred for 20 min. and then treated with 3.44 g. of 1,4-dibromobutane. The resulting solution was heated at 100° for 45 min. and then poured into 500 ml. of water. The precipitate was obtained by filtration and extracted with 500 ml. of boiling acetone. The residual crystalline product was filtered and recrystallized from a dichloromethane, methanol mixture to give 1,1'-tetramethylene bis[7-bromo-1,3-dihydro-5-(2-pyridyl)-2H-1,4-benzodiazepin-2-one] as white prisms, M.P. 257–259°.

We claim:
1. A compound selected from the group consisting of compounds of the formula

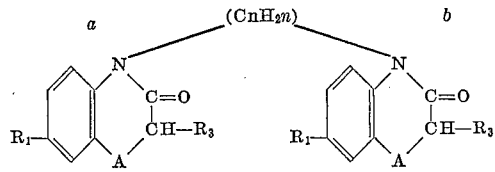

and pharmaceutically acceptable acid addition salts thereof wherein A is selected from the group consisting of

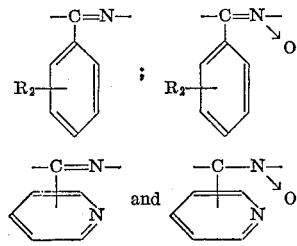

$n$ is a whole integer from 3 to 7; $R_1$ is selected from the group consisting of hydrogen, halogen, trifluoromethyl, lower alkylthio, nitro, cyano and lower alkyl; $R_2$ is selected from the group consisting of hydrogen, halogen, trifluoromethyl, lower alkyl and nitro; and $R_3$ is selected from the group consisting of hydrogen and lower alkyl.

2. 1,1 - tetramethylene - bis(7 - chloro - 5 - (2 - fluorophenyl)-1,3-dihydro-2H-1,4-benzodiazepine-2-one).

3. 1,1 - tetramethylene - bis(7 - chloro - 1,3 - dihydro-5-phenyl-2H-1,4-benzodiazepin-2-one).

4. 1,1' - tetramethylene - bis[5 - (2 - chlorophenyl) - 7-nitro-1,3-dihydro-2H-1,4-benzodiazepin-2-one].

5. 5 - 2 - fluorophenyl) - 5' - phenyl - 1,1' - tetramethylene - bis[7 - chloro - 1,3 - dihydro - 2H - 1,4 - benzodiazepin-2-one].

6. 1,1' - tetramethylene bis[7 - bromo - 1,2 - dihydro-5-(2-pyridyl)-2H-1,4-benzodiazepin-2-one].

7. A process which comprises a reaction of a compound having the formula of

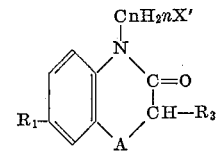

wherein A is selected from the group consisting of

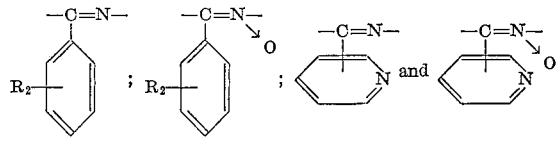

$n$ is a whole integer from 3 to 7;
$R_1$ is selected from the group consisting of hydrogen, halogen, trifluoromethyl, lower alkyl-thio, nitro, cyano and lower alkyl;
$R_2$ is selected from the group consisting of hydrogen, halogen, trifluoromethyl, lower alkyl and nitro;
$R_3$ is selected from the group consisting of hydrogen and lower alkyl and; X' is halogen
with a sodio derivative of a compound having the formula

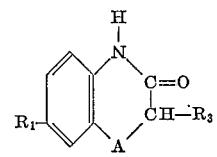

wherein A, $n$, $R_1$ and $R_3$ are as above,
at least one of A, $R_1$, $R_2$ and $R_3$ being different in Formulae I and II above.

No references cited.

WALTER A. MODANCE, *Primary Examiner.*

R. T. BOND, *Assistant Examiner.*